(12) United States Patent
Fijany et al.

(10) Patent No.: US 8,775,124 B2
(45) Date of Patent: Jul. 8, 2014

(54) METHOD FOR THE GENERATION OF ANALYTICAL REDUNDANCY RELATIONS FOR SYSTEM DIAGNOSTICS

(75) Inventors: Amir Fijany, Serra Ricco' (IT); Farrokh Vatan, West Hills, CA (US)

(73) Assignee: Fondazione Istituto Italiano di Technologia, Genoa (IT)

( * ) Notice: Subject to any disclaimer, the term of this patent is extended or adjusted under 35 U.S.C. 154(b) by 64 days.

(21) Appl. No.: 12/717,798

(22) Filed: Mar. 4, 2010

(65) Prior Publication Data

US 2010/0235143 A1 Sep. 16, 2010

(30) Foreign Application Priority Data

Mar. 11, 2009 (IT) .............................. TO2009A0182

(51) Int. Cl.
*G01R 31/00* (2006.01)
*G06F 11/08* (2006.01)

(52) U.S. Cl.
USPC ................... 702/185; 703/2; 703/13; 714/26; 714/E11.029; 714/E11.03; 702/58; 702/59; 702/182; 702/183

(58) Field of Classification Search
USPC ............ 702/58, 59, 182, 183, 185; 703/2, 13; 714/26, E11.029, E11.03
See application file for complete search history.

(56) References Cited

U.S. PATENT DOCUMENTS 6,925,127 B1 * 8/2005 Dent .............................. 375/260
7,249,003 B2 * 7/2007 Fijany et al. .................. 702/196
2006/0195302 A1 8/2006 Fijany et al.
2008/0004840 A1 * 1/2008 Pattipatti et al. .............. 702/183
2008/0294374 A1 * 11/2008 Guralnik et al. .............. 702/179

OTHER PUBLICATIONS

Written Opinion from the Italian Patent and Trademark Office for application ITTO20090182 (made of record by the applicant).*
Amir Fijany, et al., "A New Efficient Algorithm for Analyzing and Optimizing the System of Sensors", IEEE Aerospace Conference, Mar. 2006, pp. 1-8.
Amir Fijany, et al., "A New Method for Sensor Placement Optimization", Proceedings of $41^{st}$ AIAA/ASME/SAE/ASEE Joint Propulsion Conference & Exhibit, AIAA 2005-3715, Jul. 2005, pp. 1-8.
Amir Fijany, et al., "A Unified and Efficient Algorithmic Approach to Model-Baesd Diagnosis and Optiimal Sensor Placement", Proceedings of $8^{th}$ International Symposium on Artificial Intelligence, Robotics and Automation in Space, Sep. 2005, pp. 1-8.
Amir Fijany, et al., "A New Efficient Method for System Structural Analysis and Generating Analytical Redundancy Relations", Aerospace Conference, Mar. 7, 2009, pp. 1-12.
"Call for Papers", IEEE Aerospace Conference 2009, 2008, pp. 2-3.
Mattias Krysander, et al., "Sensor Placement for Fault Diagnosis", IEEE Transactions on Systems, Nov. 1, 2008, pp. 1398-1410, vol. 38, No. 6.
Louis Trave-Massuyes, et al., "Diagnosability Analysis Based on Component-Supported Analytical Redundancy Relations", IEEE Transactions on Systems, Man and Cybernetics, Nov. 1, 2006, pp. 1146-1160, vol. 36, No. 6.

* cited by examiner

*Primary Examiner* — Sujoy Kundu
*Assistant Examiner* — L. Anderson
(74) *Attorney, Agent, or Firm* — Sughrue Mion, PLLC (57) ABSTRACT

A method for generating a set of analytical redundancy relations representative of a system with which a plurality of sensors is associated for the observation of variables indicative of operating conditions and adapted to enable detection and discrimination of faults. A complete set of analytical redundancy relations of the system is built from a set of intermediate relations established between observable and non-observable variables of the system, wherein each intermediate relation is generated by combining two predetermined relations $R_j$, $R_k$, each of which is expressed in an implicit form as a tuple (i) of a subset $S_j$ of system variables, (ii) of the set $C_j$ of the support components for said relation, and (iii) of the set $T_j$ of the primary relations used to derive said intermediate relation.

7 Claims, 3 Drawing Sheets

METHOD FOR THE GENERATION OF ANALYTICAL REDUNDANCY RELATIONS FOR SYSTEM DIAGNOSTICS

FIELD OF THE INVENTION

This invention pertains to system diagnostics in general and to structural analysis of control systems.

More specifically, it relates to the generation of Analytical Redundancy Relations used in model-based system diagnostics and in analysis, optimization and validation of sensors systems for complex systems control.

Specifically, the invention relates to a method for the generation of Analytical Redundancy Relations of the type defined in the preamble of Claim 1.

BACKGROUND OF THE INVENTION

The operation of a plant—in this description and in the attached claims this term means industrial plants, manufacturing or research equipment, various types of vehicles (e.g. aircraft)—is controlled usually by means of complex diagnostic systems able to detect and isolate faulty operation conditions as soon as they happen.

In the last few decades research in the field of model-based diagnostics has developed mainly along two different approaches: the first one (FDI, Fault Detection and Isolation) is based on automatic control theory and statistical decisions, while the second, called DX, is based on artificial intelligence techniques. The basic principle of model-based diagnostics is to compare the nominal or expected behavior of a system, provided by a model of the system, to the actual behavior shown by measurements on the system. An Analytical Redundancy Relation, ARR, also known as residual or parity equation, used in the FDI approach, is a relation among measured parameters of the system. Any unsatisfied ARR would represent a discrepancy between the expected and the actual behavior of the system. The DX approach is based on the concept of conflict, which is a set of assumptions on the modes of some components that is not consistent with the model of the system and the measurements. Recently a unifying framework has shown the equivalence of both approaches. The link between the concepts of ARR and of conflict is that the support of an ARR, i.e., the set of components involved in that ARR, is a possible conflict, i.e., there is a possible scenario of measurements on the system which produces that set as a conflict.

The Analytical Redundancy Relations have an important role not only in system diagnostics, but also in analysis and optimization of the systems of sensors used for diagnostic purposes.

The quality and efficiency of a diagnostic system depends on the availability and relevance of the information that said system can obtain from the system under diagnosis. The quality of the measurements is expressed by the diagnosability degree, i.e., given a set of sensors, by which faults can be discriminated. There is no simple relation between the number of sensors and the diagnosability degree of a system. Just increasing the number of sensors does not necessarily guarantee a higher level of diagnosability, while on the other hand it is desirable to achieve a desired degree of diagnosability at the lowest possible cost.

The structural properties of the plant under control and the potential information carried by each sensor are presented in the set of ARRs. The information from the set of all ARRs can be summarized in a signature matrix.

The problem of sensor optimization can therefore be formulated as a combinatorial problem applied to the signature matrix, or as an integer programming problem involving said matrix.

Analytical Redundancy Relations and Fault Signature Matrix

In the following the concepts of Analytical Redundancy Relations (ARR) and Fault Signature Matrix (FSM) will be introduced and briefly explained. For clarity and simplicity, the case of a single fault of a system will be assumed.

The System Model (SM) is defined to consist of the Behavioral Model (BM) and the Observation Model (OM) The Behavioral Model BM is a component-based description of the system and consists of a set of Primary Relations (PRs). Each component is described by the function that it performs, i.e., by one or more PRs, and its inputs and outputs, such a component-based description also includes the topology of the system. The OM is the set of relations defining the observations that are performed on the system and the sensor models.

Figure 1:
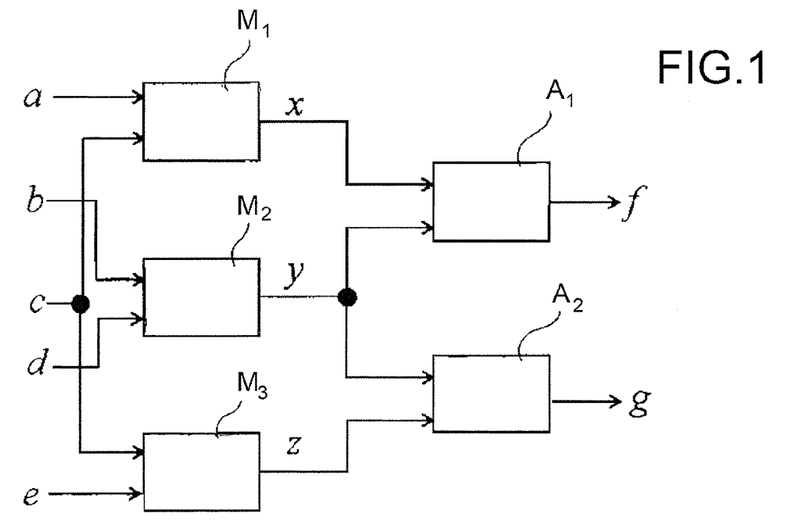
FIG. 1 is a circuit diagram of a multiport system, analyzed in the introductory part of this description.

FIG. 1 shows an example of a polybox system consisting of three Multipliers ($M_1$, $M_2$, $M_3$) and two adders ($A_1$, $A_2$).

The Behavioral Model BM for this system, representing a component-based description and the topology, is given by a set of PRs and their associated components as:

$PR_1$: x=a c; $M_1$
$PR_2$: y=b d; $M_2$
$PR_3$: z=c e; $M_3$
$PR_4$: f=x+y; $A_1$
$PR_5$: g=y+z; $A_2$

The set of variables (V) of the system can be decomposed into the set of unknown (unobserved) variables (X) and the set of observed variable (O), i.e., V=X∪O.

A Redundancy Relation (ARR) is a constraint deduced from the system model (SM). ARRs can be derived from SM by eliminating the unknown (unobserved) variables from the PRs. Therefore, an ARR contains only, and hence can be evaluated from, observed variables.

An associated concept is the support of an ARR, that is, the subset of components that are involved in the derivation of the ARR.

For the system of FIG. 1, if the sensors are placed at outputs f and g, and with known inputs a-e, then O={a, b, c, d, e, f, g} and X={x, y, z}.

The resulting ARRs are given in following Table:

TABLE 1

ARR, support components, and sensors
for the polybox example in FIG. 1

| ARRs | Support Components | Sensors |
|---|---|---|
| $ARR_1$: f = ac + bd | $M_1, M_2, A_1$ | f |
| $ARR_2$: g = bd + ce | $M_2, M_3, A_2$ | g |
| $ARR_3$: f − g = ac − ce | $M_1, M_3, A_2, A_1$ | f, g |

ARRs are used to check the consistency of the observations with respect to SM. That is, the ARRs are satisfied if the observed system behavior satisfies the model constraint. Under single-fault exoneration assumption, if a component of an ARR support is faulty, then that ARR is not satisfied. In fact, coupled with the concept of support set, this forms the foundation of model-based diagnosis approach in the FDI community Let us consider the Fault Signature Matrix (FSM), resulting from the derivation of ARRs. The FSM is defined as a binary (0-1) matrix whose rows are ARRs and columns are faults (components). An element $FS_{ij}$ of this matrix is assigned 1 if component $C_i$ is part of support of $ARR_j$, otherwise $FS_{ij}=0$. The i-th column corresponding to component $C_i$ is defined as the fault signature vector of $C_i$ and it is denoted as $FS_i=[FS_{i1}, \ldots, FS_{in}]^t$.

For the polybox system of FIG. 1, the FSM can be derived from Table 1 and is given in Table 2.

TABLE 2

Fault Signature Matrix for Polybox System of FIG. 1

|  | $A_1$ | $A_2$ | $M_1$ | $M_2$ | $M_3$ |
| --- | --- | --- | --- | --- | --- |
| $ARR_1$ | 1 | 0 | 1 | 1 | 0 |
| $ARR_2$ | 0 | 1 | 0 | 1 | 1 |
| $ARR_3$ | 1 | 1 | 1 | 0 | 1 |

The model-base diagnosis approach in FDI is based on evaluation of ARRs given a set of system observations.

If an $ARR_i$ is satisfied based on the observation, then $ARR_i=0$, otherwise $ARR_i=1$. The ARRs are instantiated with the observed values providing an observed signature. The signature of i-th observation is defined as a binary vector $OS_i=[OS_{i1}, \ldots, OS_{in}]^t$, where $OS_{ij}=0$ if $ARR_j$ is satisfied by the observations, and $OS_{ij}=1$ otherwise.

Table 3 shows the diagnosis of the polybox system of FIG. 1 based on different observation signatures.

TABLE 3

Diagnosis of polybox system of FIG. 1 using ARRs for different Observation Signatures

|  | Obs | | | | |
| --- | --- | --- | --- | --- | --- |
| $ARR_1$ | 0 | 0 | 1 | 1 | 1 |
| $ARR_2$ | 0 | 1 | 0 | 1 | 1 |
| $ARR_3$ | 0 | 1 | 1 | 0 | 1 |
| Fault Diagnosis | none | $A_2; M_3$ | $A_1; M_1$ | $M_2$ | none |

The diagnosis is then based on the faults accounted for in the fault signature matrix. That is, an observed signature $OS_i=[OS_{i1}, \ldots, OS_{in}]^t$ is consistent with a fault signature $FS_i=[FS_{i1}, \ldots, FS_{in}]^t$ if $FS_{ij}=OS_{ij}$ for all j.

As an example, for the polybox system of FIG. 1, the observation signature $[0,1,1]^t$ is equivalent to the fault signature of components $A_2$ and $M_3$. Note that this indicates that, due to the system sensors, the faults of $A_2$ and $M_3$ cannot be discriminated, as is the case for $A_1$ and $M_1$.

The criteria of fault detection and isolation (faults discrimination) can be described in terms of FSM.

All faults can be detected (full detection) if there is no all zero column (i.e., no zero fault signature vector) in FSM. That is, for a given faulty component $C_i$ at least one ARR is affected. The isolation is assured by requiring that no two columns of FSM be identical since it implies that the two fault signature vectors are identical and hence cannot be distinguished.

The above discussion allows a straightforward description of the sensors analysis approach. Given an SM and a set of deployed sensors, derive the corresponding set of ARRs and form the corresponding FSM. The analysis of the resulting FSM can reveal the degree of detection, i.e. the number of all zero columns, which implies faulty components with zero fault signature vectors, and the ambiguity sets, i.e., the number and groups of faulty components with identical signature vectors, which implies the sets of components whose fault cannot be distinguished.

Considering what written above a preliminary statement of sensor optimization problem can be also given as follows. Starting with a SM, assign a hypothetical sensor to any point in the system which can be, physically and practically, measured (i.e., a sensor can be deployed at that point). Assign a cost function to any hypothetical sensor. Then derive the set of ARRs for this set of hypothetical sensors and form the corresponding FSM, called the Hypothetical Fault Signature Matrix (HFSM).

The optimization process can now be described as follows. Eliminate the subset of sensors with maximum cost (i.e., retain the subset of sensors with the minimum cost) while achieving maximum detection and isolation. Mathematically, this process is performed as follows: For a subset of sensors to be deleted, eliminate the ARRs which are affected by these sensors. Check the resulting FSM for detection and isolation, i.e., for no zero columns and no two identical columns.

It can be seen that this process does not represents a rigorous formulation of the optimization problem. And, in fact, current approaches to sensor optimization, based on the concept of FSM, are based on exhaustive searches which can be only applied to small systems.

It can be concluded that a key step and challenge in both sensor optimization and analysis is the derivation of ARRs to form the FSM.

Complexity of Derivation of Analytical Redundant Relations

A key problem in the application of ARRs is the efficient derivation of the complete set of ARRs. In the following, we discuss some key issues regarding the complexity of the derivation of ARRs.

Possible Number of ARRs

The first issue is actually the possible number of Analytical Redundant Relations. Consider a system described by n Primary Relations (usually this means that the system has n components, but in general this could imply that the system has at most n components) and m sensors (observations) where, for most practical cases, n>m.

If one considers the ARRs only as functions of all possible combinations of observations, then one would conclude that the total number of ARRs would be of the order of $O(2^m)$. On the other hand, if one considers that ARRs are obtained from combination of PRs, through elimination of unknown variables, this would then imply an upper bound of $O(2^n)$ for the number of ARRs.

The key point, which the inventors believe has not received sufficient attention in the technical note, is that ARRs can involve all possible combinations of PRs and observations.

In fact, a same set of PRs can lead to different ARRs, that is, ARRs with same set of support components but with different set of observations.

One can also consider cases wherein a same set of observations could lead to different ARRs which differ in their support components.

Taking this view, it can then be concluded that the upper bound on total number of ARRs is in fact of the order of $O(2^{n+m})$. Note that for any practical system of interest the number of ARRs would be finite due to the system's structural constraints. In fact, an infinite number of ARRs implies that the system is not diagnosable!

Completeness of Set of ARRs and Redundant ARRs

A key fundamental issue in application of ARRs for both diagnosis and sensor placement is the completeness of the set of ARRs.

More precisely, it seems that the issue of minimal complete set of ARRs has not received enough attention.

In the literature the two concepts of d-completeness (completeness for detection of faults) and i-completeness (completeness for isolation of faults) have been discussed. However, these two concepts can be applied for analysis of applicability of a given set of ARRs for diagnosis. And, it seems that there is no discussion of the derivation of complete set of ARRs in the literature. It is quite obvious that completeness is a fundamental issue in both diagnosis and sensor placement since maximum available information provided by ARRs is needed.

It is also obvious that any application of an incomplete set of ARRs for both diagnosis and sensor placement might lead to wrong and/or suboptimal results.

Let's consider the definition of ARRs: "an ARR is a constraint deduced from the system model which contains only observed variables, and which can therefore be evaluated from any observer". Following this definition, then any trivial combination of any existing two ARRs can be then consider as a new ARR. Therefore, such a definition can lead to derivation of redundant ARRs.

In order to assure the completeness, we should consider all possible combinations of PRs in an exhaustive and complete fashion. In fact, if the focus of a method is only on searching the common variables and their elimination, as is the case for the known algorithm, then this would lead to an incomplete set of ARRs and, depending on the ordering in variable elimination, to ARRs sets with variable size.

We consider a set of ARRs as a complete set if it can be shown that any new ARR is just a trivial combination of existing ARRs.

We define a redundant ARR as one that can be obtained by trivial combination of existing ARRs, e.g., addition of two existing ARRs without eliminating any unknown variables.

An interesting example is the system of FIG. 1.

While $ARR_3$ of Table 1 seems to be a simple subtraction of $ARR_1$ and $ARR_2$, indeed it has been obtained through elimination of unknown variables at several steps. However, a simple addition of $ARR_1$ and $ARR_2$ will lead to a redundant ARR which does not provide any information for diagnosis.

The problem with redundant ARRs is that they can significantly increase the complexity of the derivation of ARRs, even leading to an exponential complexity.

To see this, consider a system with L ARRs. If any trivial combination of any existing ARRs is consider as a new ARR, then this would lead possibly to a total number of $O(2^L)$ ARRs and hence the exponential complexity in the derivation.

The key point is that, a given algorithm might also derive redundant ARRs, even though it avoids trivial combination of existing ARRs, thus resulting in an exponential complexity in the derivation.

Consider a basic definition for derivation of ARRs as "ARRs can be obtained from the system model by eliminating the unknown variables". However, eliminating a common unknown variable between two ARRs might lead to a redundant ARR. To see this, note that as we stated before, we also define an ARR based on the set of PRs used for its derivation. If two ARRs have a common unknown variable but also a common PR in their derivation, then the elimination of the common variable would lead to an ARR which is a trivial combination of previous ARRs, i.e. a redundant ARR.

Complexity of Derivation of ARRs

An ARR is obtained as a result of combination of a set of Primary Relations through elimination of unknown variables. Such a process is associative and hence can be performed in any order. Consider an $ARR_i$ resulting from combination of k Primary Relations. Neglecting the first combination of two PRs in its derivation, and considering all possible ordering in the derivation, it then follows that the same $ARR_i$ might be obtained, possibly, in at most k!/2 ways. In fact, if a given algorithm performs an exhaustive search for finding common unknown variables and derive new ARRs by eliminating the common variable, then the same ARR might be derived many times, potentially in a factorial time in the number of PRs, which might lead to an algorithm with time complexity factorial in the number of primary relations. Indeed, it seems that the exponential complexity of known algorithm, which is based on finding and eliminating common variables, is due to this fact. Given the associative nature of derivation of the ARRs, it seems that the repetition in the derivation of an ARR cannot be avoided.

Currently, although the concept of ARRs provides a powerful framework for sensors optimization and system diagnosability, the inventors believe that the development of efficient systematic approaches for their generation has not received sufficient attention. The current processes for the generation of analytical redundancy relations are in fact dependent on the system they describe, and the derivation of a complete set of ARR depends essentially on the experience and knowledge of an expert programmer to manipulate analytical equations, and can not be extended easily to a large number of systems or plants of interest.

SUMMARY OF THE INVENTION

The present invention aims at providing a satisfactory solution to the problems described above, avoiding the drawbacks of known techniques.

In particular, the present invention provides a method for generating a complete and correct set of analytical redundancy relations representing a system or plant of interest.

A further aim of the present invention is to provide a method for generating analytical redundancy relations which is efficient from a computational point of view, i.e. exhibits a reduced computational complexity compared to known methods.

In the present invention, such aims are achieved thanks to a method for the generation of analytical redundancy relations as explained in claim 1.

Particular embodiments of the invention are the subject of dependent claims, whose content is intended as integral or integrating part of this description.

Further subject of the invention is a computer system and a computer program for implementing this method, as claimed.

In summary, this invention is based on the principle of generating analytical redundancy relations in implicit form.

The process subject of this invention is based on the observation that the key step for sensors optimization and analysis is the formation of the Fault Signature Matrix (FSM). The FSM matrix describes logical relations between sets of sensors and components of a system or plant to be diagnosed.

Note however that, given the FSM of the system, it's possible to determine the capabilities of fault detection and isolation of sensors associated to the system without any need of knowing the explicit form of the analytical redundancy relations.

An analytical redundancy relation is a logic relation between the set of sensors involved in its evaluation and the set of its support components.

An ARR is defined on the basis of the set of variables involved in its evaluation, of the support set of components and of the set of primary relations used in its evaluation. Then, two ARR relations are considered the same if they have the same set of variables and are derived from the same set of primary relations.

The fundamental issue is that an ARR derives from a combination of a set of primary relations through the elimination of unknown variables.

In order to exploit such a logical power of ARRs, we can use them in an implicit form, i.e., without any need for deriving the analytical form.

Let's consider a simple example. Suppose that we have derived an $ARR_i$, in implicit form as $ARR_i=f_i(x,y,z)$, where x, y, and z are some measured (sensors) values, with a support set of, for example, $(c_k,c_m)$.

Such a derivation is sufficient for forming the i-th row of FSM and if we can derive all ARRs in such an implicit form then we can form the entire FSM and perform sensor optimization and analysis without any need for knowing the explicit form of functions $f_i$.

In this invention the proposed new approach is based on derivation of ARRs and of their supports as set operations.

ARRs and PRs are represented as a tuple of variable set (S) with an associated support component set (C).

For example, the above ARR, is presented as $S_i=\{x,y,z\}$ with a support set of components as $C_i=\{c_k,c_m\}$.

The elimination of common variables and hence the formation of new ARRs is performed by finding intersecting sets among the variables sets, performing a symmetric difference operation on the variables (hence eliminating the common unknown variable), and performing a union operation on the support sets to find the support set of the new ARR.

For example, if another $ARR_j$ is defined as $S_j=\{x,t,u\}$ with a support set of components as $C_j=\{c_q,c_n\}$, then the new $ARR_p$, resulting from elimination of common variable x from the two ARRs will be of the form $S_p=\{y,z,t,u\}$ with the support set of $C_p=\{c_k,c_m,c_q,c_n\}$.

Using our notations, the implicit BM for the polybox system of FIG. 1 is given as:

PR$_1$: $S_1=\{a,c,x\}$ & $C_1=\{M_1\}$
PR$_2$: $S_2=\{b,d,y\}$ & $C_2=\{M_2\}$
PR$_3$: $S_3=$ & $C_3=\{M_3\}$
PR$_4$: $S_4=\{x,y,f\}$ & $C_4=\{A_1\}$
PR$_5$: $S_5=\{y,z,g\}$ & $C_5=\{A_2\}$

This method, subject of the invention, by replacing equation and algebraic manipulations with sets and set operations, enables the derivation of implicit ARRs and hence the formation of the FSM without any need for knowing the exact analytical functions and their inversion.

However, it should be noted that for model-based diagnosis the explicit form of ARRs and their evaluation are needed.

The fundamental concept in the method is that it does not rely essentially on a search for common variable for elimination. Rather, it is based on grouping the ARRs, starting from the PRs, and on taking into account all possible combinations of ARRs for the elimination of common variables.

Advantageously, our inventive approach allows to build accurately and efficiently a complete set of analytical redundancy relations in implicit form.

Moreover, while the known algorithms exhibit exponential computational costs, the proposed method achieves a polynomial complexity, i.e., given a system with L ARR, its complexity is of the order of $O(L^4)$.

Indeed, using an appropriate order in the derivation of ARR, the inventors have enabled the limitation of the repetition of derivations of ARR by means of said algorithm to a polynomial computation time instead of factorial computation time.

BRIEF DESCRIPTION OF THE DRAWINGS

Additional features and advantages of the invention will be described in more detail in the following description, which is not to be intended as a limitative example, with reference to the attached images, in which.

DETAILED DESCRIPTION OF THE PREFERRED EMBODIMENTS

The method subject of the invention is described in the following. Let us consider the diagram of FIG. 2.

Figure 2:
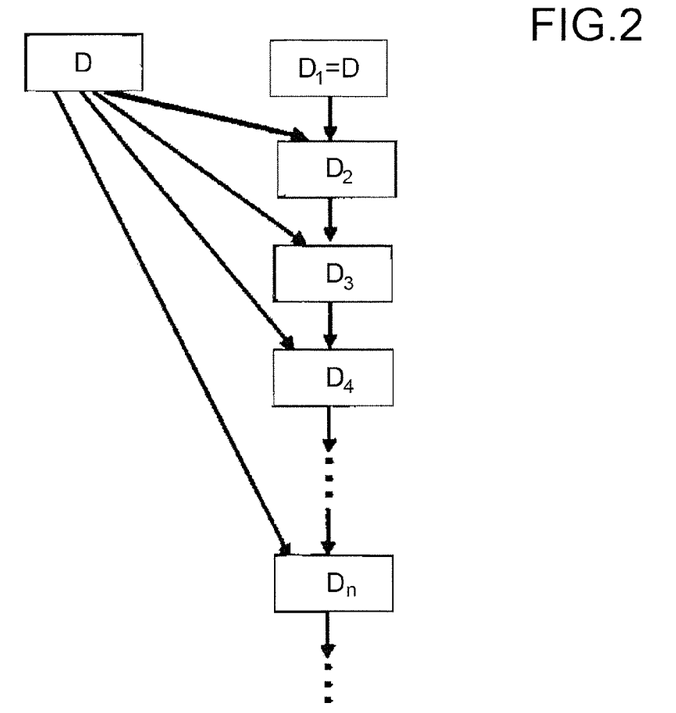
FIG. 2 is a logical diagram of generation of analytical redundancy relations according to the method subject of the invention.

The input data for the method is the set of primary relations, and the output of the method is the set of required ARRs.

Each intermediate relation, in the following $R_j$, is given by a quadruple of the following form, used to derive the set of ARRs, which by definition involve only known variables (observations):

$$R_j=(N_j,C_j,S_j,T_j)$$

where $N_j$ is the number assigned to $R_j$, $C_j$ is the set of support components, $S_j$ is the set of variables involved in $R_j$, and $T_j$ is the set of primary relations used to derive $R_j$.

Specifically, each primary relation is represented by a quadruple of the form $$R=(n_j,C_j,S_j,\{n_j\})$$

where $n_j$ is the number of the primary relation, and the last component is $\{n_j\}$, since each primary relation does not on depend on the other relations.

It is possible that we derive the same relations (intermediate or ARR) with different derivations. To avoid keeping several copies of the same ARR, we consider two ARRs $$R_j=(N_j,C_j,S_j,T_j) \text{ and } R_k=(N_k,C_k,S_k,T_k)$$

as identical if $$(S_j,T_j)=(S_k,T_k)$$

In the process of generating the ARRs, if a new intermediate relation or ARR is identical to one of the previously generated ones, said new relation is deleted from the list.

The primary relations are the initial members of the set V, and as new ARRs are found, they are added to V.

The output of the method subject of the present invention is the set V of all the different intermediate relations, which include the ARRs looked for.

One of the basic operations of the method subject of this invention is the generation of a new ARR from two given ARRs.

Suppose that we have two ARRs already in V:

$$R_j=(N_j,C_j,S_j,T_j) \text{ and } R_k=(N_k,C_k,S_k,T_k)$$

If the following two conditions are both satisfied $S_j \cap S_k \neq \{\ \}$ and $T_j \cup T_k = \{\ \}$ then for each unobservable variable $$x \in S_j \cup S_k$$

we generate the following relation:

$$R=(N,C_j \cup C_k,(S_j \cup S_k)-\{x\},T_j \cup T_k),$$

where N is a new number.

The ARR R would be added to the solution set V only if it is a new ARR; i.e., if it is not identical to any other ARR already in V.

The execution of the algorithm, or method, subject of the invention, consists of at least one, and typically a plurality of rounds, and each round includes a plurality of cycles.

In each round, the method starts from an initial set D of relations (initially, D is the set of primary relations PR).

Then the method generates the following sets:

$D_1, D_2, D_3, \ldots$ where $D_1 = D$ and $D_2$ is the set of new ARRs obtained from two ARRs in D. In general, $D_{k+1}$ is the set of new ARRs obtained from one ARR in D and one ARR in $D_k$.

A round of generating ARRs is graphically shown in FIG. 2.

We call the process of computing each set $D_k$ a cycle of ARRs generation.

We add the non-empty sets $D_k$ obtained in this way to a list Q of candidate seed sets, i.e. sets to be used as possible starting sets for further rounds.

A round stops when the combination of the relations in D and $D_n$ (last non-empty set generated in the round) does not generate any new ARR, i.e. generates the empty set.

When a round stops, a new round is executed, starting from the first set in the list Q, (which becomes the starting set of the round), removing said set from the list. The set thus selected is used as starting set in the new round if the combination of the ARRs in this set leads to a non-empty set, otherwise other candidate seed sets in Q will be selected.

The method stops when the list Q is empty, i.e. there is no remaining set available for a new round.

As an example, in FIG. 2 the first iteration of the method is shown. To perform a second iteration we set $D=D_2$ if the combination of the relations in $D_2$ leads to at least one new relation, i.e. a non-void set of relations. Otherwise other sets in Q are considered as potential candidates as starting sets.

The method ends when no set $D_k$ is available for a new round.

In the following the pseudo-code for implementing the method generating implicit ARRs as above described is given.

```
ARR_Generation (D)
/* generates the set V of all ARRs from the primary relations
in set D */
    1.    V = D
    2.    Q = { D }
    3.    while Q ≠ { }
    4.        S = first set of Q
    5.        Q = Q after removing the first set of Q
    6.        T = all new Rs obtained from D and S
    7.        if T ≠ { } then
    8.            V = V ∪ T
    9.            add T to the end of Q
    10.       end if
    11.   end while
    12.   return V
```

The while loop corresponds to the rounds, and the pseudo-instruction 6 corresponds to the cycles of the method. D is a generic identifier for the starting set for each round (it includes the primary relations in the first round).

To analyze the complexity of our algorithm, let the total number of ARRs be L.

We show that the number of operations needed to terminate the algorithm is $O(L^4)$. Indeed, the number of sets in the queue Q is at most L; so the while loop will execute at most L times. In each round of the while loop, the size of the set S is at most L and the size of set T of new ARRs is at most L and is obtained with $O(L^2)$ operations. Moreover, there are at most L such sets T. Thus each round of the while loop needs $O(L^3)$ operations; and the whole algorithm requires $O(L^4)$ operations.

We have therefore shown that advantageously the method subject of the invention for the derivation of ARRs has only polynomial complexity, contrary to the known art.

A diagnostic or plant structural analysis system includes a workstation of known type (not shown), or a distributed processing system, including a computer subsystem and local or remote input/output devices, designed to execute a processing or computing program or program groups or modules stored on disk or accessible over a network, which implement the method (algorithm) subject of this invention. These solutions here outlined are considered well-known in the art and will not be further described here, as they are not relevant to the implementation and understanding of the invention.

APPLICATION EXAMPLES

To demonstrate and validate the above described method, we describe in the following its use in two synthetic systems and in a real one.

First Example

The first application example is the polybox system of FIG. 1, previously described in the introduction.

Table 4 lists the results from the application of the method subject of the invention for the derivation of implicit ARRs for this system.

TABLE 4

Derivation of implicit ARRs for the polybox system shown in FIG. 1

| No. | Relation | Support Components | Sensors (variables) | Primary Derivation | Explicit Form |
|---|---|---|---|---|---|
| 1 | $S_1 = \{a, c, x\}$ | $M_1$ | x | $S_1$ | $x = ac$ |
| 2 | $S_2 = \{b, d, y\}$ | $M_2$ | y | $S_1$ | $y = bd$ |
| 3 | $S_3 = \{c, e, z\}$ | $M_3$ | z | $S_3$ | $z = ce$ |
| 4 | $S_4 = \{x, y, f\}$ | $A_1$ | x, y, f | $S_4$ | $f = x + y$ |
| 5 | $S_5 = \{y, z, g\}$ | $A_2$ | y, z, g | $S_5$ | $g = y + z$ |
| | $D = \{S_1, S_2, S_3, S_4, S_5\}$ | | | | |

TABLE 4-continued

Derivation of implicit ARRs for the polybox system shown in FIG. 1

| No. | Relation | Support Components | Sensors (variables) | Primary Derivation | Explicit Form |
|---|---|---|---|---|---|
| 6 | $S_6 = \{a, c, y, f\}$ | $M_1, A_1$ | y, f | $S_1, S_4$ | $f = y + ac$ |
| 7 | $S_7 = \{b, d, x, f\}$ | $M_2, A_1$ | x, f | $S_2, S_4$ | $f = x + bd$ |
| 8 | $S_8 = \{b, d, z, g\}$ | $M_2, A_2$ | z, g | $S_2, S_5$ | $g = z + bd$ |
| 9 | $S_9 = \{c, e, y, g\}$ | $M_3, A_2$ | y, g | $S_3, S_5$ | $g = y + ce$ |
| 10 | $S_{10} = \{x, z, f, g\}$ | $A_2, A_1$ | x, z, f, g | $S_4, S_5$ | $f - g = x - z$ |
|  | $D_1 = \{S_6, S_7, S_8, S_9, S_{10}\}$ | | | | |
| 11 | $S_{11} = \{a, b, c, d, f\}$ | $M_2, M_1, A_1$ | f | $S_1, S_7$ | $f = ac + bd$ |
| 12 | $S_{12} = \{a, c, z, f, g\}$ | $M_1, A_2, A_1$ | z, f, g | $S_1, S_{10}$ | $f - g = ac - z$ |
| 11' | $S_{11} = \{a, b, c, d, f\}$ | $M_2, M_1, A_1$ | f | $S_2, S_6$ | $f = ac + bd$ |
| 13 | $S_{13} = \{b, c, d, e, g\}$ | $M_3, M_2, A_2$ | g | $S_2, S_9$ | $g = bd + ce$ |
| 13' | $S_{13} = \{b, c, d, e, g\}$ | $M_3, M_2, A_2$ | g | $S_3, S_8$ | $g = bd + ce$ |
| 14 | $S_{14} = \{c, e, x, f, g\}$ | $M_3, A_2, A_1$ | x, f, g | $S_3, S_{10}$ | $f - g = x - ce$ |
| 14' | $S_{14} = \{c, e, x, f, g\}$ | $M_3, A_2, A_1$ | x, f, g | $S_4, S_9$ | $f - g = x - ce$ |
| 12' | $S_{12} = \{a, c, z, f, g\}$ | $M_1, A_2, A_1$ | z, f, g | $S_5, S_6$ | $f - g = ac - z$ |
|  | $D_2 = \{S_{11}, S_{12}, S_{13}, S_{14}\}$ | | | | |
| 15 | $S_{15} = \{a, c, e, f, g\}$ | $M_3, M_1, A_2, A_1$ | f, g | $S_1, S_{14}$ | $f - g = ac - ce$ |
| 15' | $S_{15} = \{a, c, e, f, g\}$ | $M_3, M_1, A_2, A_1$ | f, g | $S_3, S_{12}$ | $f - g = ac - ce$ |
|  | $D_3 = \{S_{15}\}$ | | | | |

For the sake of clarity, the explicit form of the equations representing the implicit relations is also shown in the table.

The method is applied to the primary relations to eliminate the (not observable) unknown variables (x,y,z).

The ARRs are the relations involving only the known variables, i.e., input (a,b,c,d,e) and sensors or observable variables (f,g), that is, relations 11, 13 and 15 in Table 4. Note that the application of the method in this case involves one round and 3 cycles, resulting in 3 sets of ARRs, $D_1$ to $D_3$. Also, note that, as stated before, a same relation can be derived in several ways. In this example, relations 11, 12, 13, 14, and 15 are each obtained from two different combinations of previous relations. However, as mentioned before, the method can detect duplicate relations and discard any duplication.

As an example of redundant relations consider $S_8$ and $S_9$ with common variable g. However, both relations have $PR_5$ (or, in other terms, the set of variables $S_5$) in their derivation. Therefore, eliminating g will lead to a redundant relation in the form of $PR_2 + PR_3$. The same is true for $S_6$ and $S_7$ with common variable f, $S_8$ and $S_{10}$ with common variable g; $S_9$ and $S_{10}$ with common variable g.

The execution of the method is terminated at the first round after 3 cycles. Here we start with the set D of the primary relations (relations 1-5 of Table 1 at the beginning of the description). The set $D_1$ (relations 6-10 in Table 4) is obtained from a relation in D with another relation in the same set. The set $D_2$ (relations 11-12') is obtained from a relation in D and a relation in $D_1$. The set $D_3$ (relations 15-15') is obtained from a relation in D and a relation in $D_2$. Combination of D and $D_3$ does not generate any new relation, which indicates the completion of the first round. The method terminates in the first round, as no set of possible candidates $D_1$, $D_2$ and $D_3$ can be used to start a new round, i.e. the combination of the relations in each set $D_1$, $D_2$ and $D_3$ does not lead to any new relation. Therefore, the method terminates at this stage.

Second Example

Figure 3:
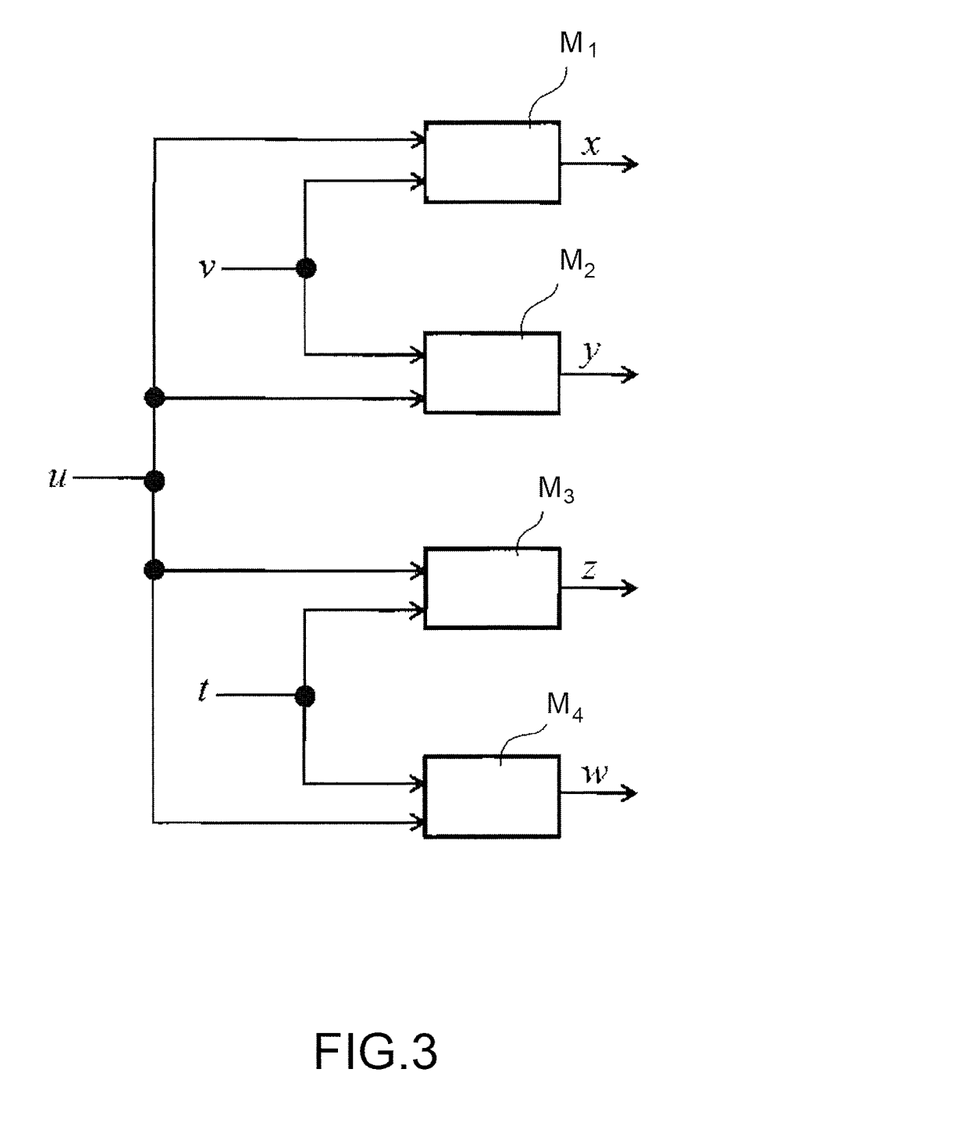
FIG. 3 is a circuit diagram of a multiport electrical system to exemplify the method that is subject of the invention.

We consider another synthetic polybox case, as shown in FIG. 3, with four adders $M_1$-$M_4$, three inputs, respectively u, v, t, and four outputs x, y, z, w.

The set of primary relations and their associated components are given as:
$PR_1$: x=u+v; $M_1$
$PR_2$: y=u−2 v; $M_2$
$PR_3$: z=u+t; $M_3$
$PR_4$: w=u−2 t; $M_4$ A specific feature of this system is that there are more than one common variable among its primary relations. Suppose that all variables are observed. In Table 5 the 24 ARRs are shown.

TABLE 5

Complete set of ARRs for polybox system of FIG. 3

| No. | Relation | Support Components | Sensors (variables) | Derivation | Explicit Form |
|---|---|---|---|---|---|
| 1 | $S_1 = \{x, u, v\}$ | $M_1$ | x, u, v | 1 | $x = u + v$ |
| 2 | $S_2 = \{y, u, v\}$ | $M_2$ | y, u, v | 2 | $y = u - 2v$ |
| 3 | $S_3 = \{z, u, t\}$ | $M_3$ | z, u, t | 3 | $z = u + t$ |
| 4 | $S_4 = \{w, u, t\}$ | $M_4$ | w, u, t | 4 | $w = u - 2t$ |
|  | $D = \{S_1, S_2, S_3, S_4\}$ | | | | |
| 5 | $S_5 = \{x, y, v\}$ | $M_1, M_2$ | x, y, v | 1, 2 | $x - y = 3v$ |
| 6 | $S_6 = \{x, y, u\}$ | $M_1, M_2$ | w, u, t | 1, 2 | $2x + y = 3u$ |
| 7 | $S_7 = \{x, z, v, t\}$ | $M_1, M_3$ | x, z, v, t | 1, 3 | $x - z = v - t$ |
| 8 | $S_8 = \{x, w, v, t\}$ | $M_1, M_4$ | x, w, v, t | 1, 4 | $x - w = v - 2t$ |
| 9 | $S_9 = \{z, y, v, t\}$ | $M_2, M_3$ | z, y, v, t | 2, 3 | $z - y = 2v + t$ |
| 10 | $S_{10} = \{y, w, t, v\}$ | $M_2, M_4$ | y, w, t, v | 2, 4 | $y - w = 2t - 2v$ |
| 11 | $S_{11} = \{z, w, u\}$ | $M_3, M_4$ | z, w, u | 3, 4 | $2z + w = 3u$ |
| 12 | $S_{12} = \{z, w, t\}$ | $M_3, M_4$ | z, w, t | 3, 4 | $z - w = 3t$ |
|  | $D_1 = \{S_5, S_6, \ldots, S_{12}\}$ | | | | |

TABLE 5-continued

Complete set of ARRs for polybox system of FIG. 3

| No. | Relation | Support Components | Sensors (variables) | Derivation | Explicit Form |
|---|---|---|---|---|---|
| 13 | $S_{13} = \{z, y, x, u, t\}$ | $M_1, M_2, M_3$ | z, y, x, u, t | 1, 9 | $z - y = 2x - 2u + 1$ |
| 14 | $S_{14} = \{y, w, x, u, t\}$ | $M_1, M_2, M_4$ | y, w, x, u, t | 1, 10 | $y - w = 2t - 2x - 2u$ |
| 15 | $S_{15} = \{z, w, x, v\}$ | $M_1, M_3, M_4$ | z, w, x, v | 1, 11 | $2z + w = 3x - 3v$ |
| 16 | $S_{16} = \{z, w, y, v\}$ | $M_2, M_3, M_4$ | z, w, y, v | 2, 11 | $2z + w = 3y + 6v$ |
| 17 | $S_{17} = \{x, y, z, t\}$ | $M_1, M_2, M_3$ | x, y, z, t | 3, 6 | $2x + y = 3z - 3t$ |
| 18 | $S_{18} = \{x, w, v, z, u\}$ | $M_1, M_3, M_4$ | x, w, v, z, u | 3, 8 | $x - w = v - 2z + 2u$ |
| 19 | $S_{19} = \{y, w, z, u, v\}$ | $M_2, M_3, M_4$ | y, w, z, u, v | 3, 10 | $y - w = 2z - 2u - 2v$ |
| 20 | $S_{20} = \{x, y, w, t\}$ $D_2 = \{S_{13}, S_{14}, \ldots, S_{20}\}$ | $M_1, M_2, M_4$ | x, y, w, t | 4, 6 | $2x + y = 3w + 6t$ |
| 21 | $S_{21} = \{z, w, y, x, u\}$ | $M_1, M_2, M_3$ | z, w, y, x, u | 1, 16 | $2z + w = 3y + 6x - 6u$ |
| 22 | $S_{22} = \{y, w, z, x, v\}$ | $M_1, M_2, M_3$ | y, w, z, x, v | 1, 19 | $y - w = 2z - 2x - 4v$ |
| 23 | $S_{23} = \{y, w, t, x, z\}$ $D_3 = \{S_{21}, S_{22}, S_{23}\}$ | $M_1, M_2, M_3$ | y, w, t, x, z | 3, 14 | $y - w = 4t - 2x - 2z$ |
| 24 | $S_{24} = \{z, w, x, y\}$ $D_4 = \{S_{24}\}$ | $M_1, M_2, M_3$ | z, w, x, y | 6, 11 | $2z + w = 2x + y$ |

Instead, the application of a well known algorithm in the literature for the derivation of analytical redundancy relations, allows the generation of fewer intermediate relations (14, 15, or at most 17) depending on the order of the variables selected for elimination. For example, it is not possible to produce relation $S_{13}$ shown in the table as: $2x+y-z+t-2u=0$. This example clearly shows that focusing on the variables alone can result in incomplete set of ARRs. Another interesting feature of this example is that, as shown e.g. by $S_5$ and $S_6$, it shows that different ARRs can have the same set of support components and the same set of PRs in their derivation but different set of variables.

Note that, in this example, the method consists of two rounds. The first round includes three cycles and produces the sets $D_1$, $D_2$ and $D_3$. The second round starts setting as initial set $D=D_1$ and includes only one cycle that produce the set $D_4$. The second round terminates since there aren't any further combinations between relations in $D_1$ and $D_4$. The method terminates since none of the remaining candidate sets leads to the generation of new relations.

Third Example

The GE Gas Turbine

Figure 4:
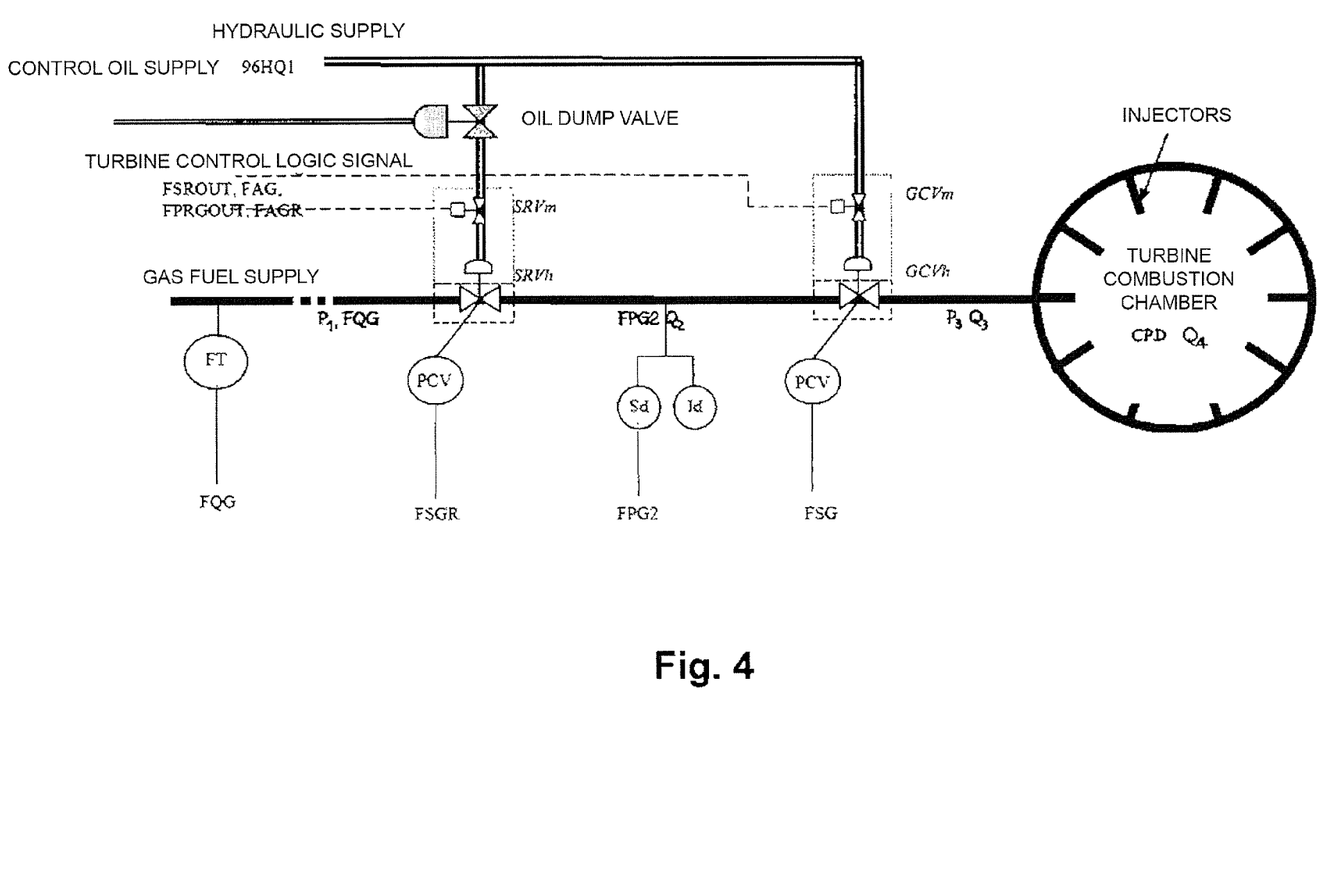
FIG. 4 is a schematic diagram of a turbine system used to exemplify the method subject of the invention.

The following example is a real world one, a Gas Turbine System schematically represented in FIG. 4.

The main components of the system are two actuators: Stop Ratio Valve (SRV) and Gas Control Valve (GCV). These valves are connected in series and control the flow of gas fuel that enters the combustion chambers of the turbine. The first of these valves, SRV, is controlled by a feedback loop that maintains a constant gas pressure (pressure between the two valves) at its output FPG2. This pressure being constant, the gas fuel flow is only determined by the setting of GCV. Hence, GCV is a position controlled valve.

The components of the system are:
GCVh—Gas Control Valve (hydraulic component);
SRVh—Stop Ratio Valve (hydraulic component);
GCVm—Gas Control Valve (mechanic component); and
SRVm—Gas Control Valve (mechanic component).

We consider faults on components: GCVm, GCVh, SRVm, SRVh, injectors and four transducers.

The set of faults is given by:
{GCVm, GCVh, SRVm, SRVh, Inj, TFSG, TFSGR, TFQG, TCPD}
where the symbol "Txyz" denotes the fault in the sensor "xyz". The primary relations and their associated variables are shown in Table 6.

TABLE 6

Gas Fuel Subsystem primary relations

| Component | Relation | Equation | Exogenous variables |
|---|---|---|---|
| Injectors | $r_1$ | $Q_3 = K_{inj}\sqrt{P_3 - CPD}$ | CPD |
| Injectors | $r_2$ | $Q_4 - K_{lix} Q_3 = 0$ | |
| GCVh | $r_3$ | $Q_2 = FSG\sqrt{FPG2 - P_3}$ | |
| GCVh | $r_4$ | $Q_3 - K_1 Q_2 = 0$ | |
| SRVh | $r_5$ | $FQG = FSGR\sqrt{P_1 - FPG2}$ | $P_1$ |
| SRVh | $r_6$ | $Q_2 - K_1 FQG = 0$ | |
| GCVm | $r_7$ | FSG = f(FAG, 96HQL) | 96HQL |
| SRVm | $r_8$ | FSGR = f(FAGR, 96HQL) | 96HQL |
| GCVm | $r_9$ | FSG = f(FSROUT, 96HQL) | FSROUT, 96HQL |
| SRVm | $r_{10}$ | FSGR = f(FPG2, FPRGOUT, 96HQL) | FPRGOUT, 96HQL |
| SRVm + SRVh | $r_{11}$ | FPG2 = f(FPRGOUT) | FPRGOUT |

Note that here some of the primary relations are in implicit form and only indicate the functional relation between variables.

The structural matrix of the system is shown in Table 7.

TABLE 7

Gas Fuel Subsystem structural matrix

| | variables | | | | | | | | |
|---|---|---|---|---|---|---|---|---|---|
| Faults | Q2 | Q3 | Q4 | P3 | FPG2 | FQG | FSG | FAG | FAGR |
| Injector, TCPD | | X | | X | | | | | |
| Injector | | X | X | | | | | | |
| GCVh, TFSG | X | X | | X | X | | | | |
| GCVh | X | X | | | | | | | |

TABLE 7-continued

Gas Fuel Subsystem structural matrix

| | variables | | | | | | | | | |
|---|---|---|---|---|---|---|---|---|---|---|
| Faults | Q2 | Q3 | Q4 | P3 | FPG2 | FQG | FSG | FSGR | FAG | FAGR |
| SRVh, TFSGR, TFQG | | | | | | X | | X | | |
| SRVh, TFQG | X | | | | | X | | | | |
| GCVm, TFSG | | | | | | | X | | X | |
| GCVm, TFSGR | | | | | | | X | | | |
| SRVm, TFSG | | | | | | | | X | | X |
| SRVm, TFSGR | | | | | | | | X | | |
| SRVm, SRVh | | | | | X | | | | | |

This matrix shows that each primary relation of Table 6 is related to specific faults of the system.

Using the method subject of the present invention for derivation of ARRs and the resulting FSM, it is possible to perform an analysis of the system and draw the following conclusions.

Using the structural matrix of Table 7, it is first possible to assume that the sensors can be actually placed at 9 locations Q2, Q3, P3, FPG2, FQG, FSG, FSGR, FAG, FAGR. Using the method it is possible to obtain 551 implicit ARRs and the related HFSM matrix.

As a check we also implemented and used the algorithm described in L. Travé-Massuyès, T. Escobet, and X. Olive, "Diagnosability Analysis Based on Component-Supported Analytical Redundancy Relations," IEEE Transactions on Systems, Man, & Cybernetics, Part A: Systems and Humans, Vol. 36, n. 6, pp. 1146-1160, November 2006.

Table 8 shows the comparison between the two methods in terms of computation time and number of derived ARRS. Note that the two methods are implemented using algorithms described in the same language (Mathematica) and run on the same computer platform.

TABLE 8

Comparison of two methods for the derivation of ARRs for the Gas Fuel Subsystem of GE Gas Turbine

| Method | Number of ARRs | Computation time [s] |
|---|---|---|
| Known algorithm | 317 | 1606.47 |
| Invention | 551 | 0.703 |

As can be seen, the known algorithm not only produces an incomplete set, but also it is much more inefficient in terms of computation time.

In the following, we deal with sensor analysis and optimization for the system.

To analyze the existing 4 sensors in the system, forming the set {FSGR, FQG, FPG2, FSG}, we first extracted from the original 551 ARRs the set of 26 ARRs corresponding to the 4 deployed sensors. The FSM resulting from these ARRs is presented in the following Table 9.

TABLE 9

Fault Signature Matrix resulting from 4 actual sensors of Gas Turbine.

| | faults | | | | | | | | |
|---|---|---|---|---|---|---|---|---|---|
| ARR | GCVh | GCVm | Injt | SRVh | SRVm | TCpd | Tfqg | Tfsg | Tfsgr | Sensors |
| ARR1 | 0 | 0 | 0 | 1 | 0 | 0 | 1 | 0 | 1 | {fpg2, fqg, fsgr} |
| ARR2 | 0 | 1 | 0 | 0 | 0 | 0 | 0 | 1 | 0 | {fsg} |
| ARR3 | 0 | 0 | 0 | 0 | 1 | 0 | 0 | 0 | 1 | {fsgr} |
| ARR4 | 0 | 0 | 0 | 1 | 1 | 0 | 0 | 0 | 0 | {fpg2} |
| ARR5 | 0 | 0 | 0 | 1 | 1 | 0 | 1 | 0 | 1 | {fpg2, fqg} |
| ARR6 | 0 | 0 | 0 | 1 | 1 | 0 | 1 | 0 | 1 | {fqg, fsgr} |
| ARR7 | 0 | 0 | 0 | 1 | 1 | 0 | 1 | 0 | 1 | {fqg} |
| ARR8 | 1 | 0 | 1 | 1 | 0 | 1 | 0 | 1 | 0 | {fpg2, fqg, fsg} |
| ARR9 | 1 | 0 | 1 | 1 | 0 | 1 | 0 | 1 | 1 | {fqg, fsg, fsgr} |
| ARR10 | 1 | 0 | 1 | 1 | 0 | 1 | 0 | 1 | 0 | {fpg2, fsg, fsgr} |
| ARR11 | 1 | 1 | 1 | 1 | 0 | 1 | 0 | 1 | 0 | {fpg2, fqg} |
| ARR12 | 1 | 0 | 1 | 1 | 1 | 1 | 1 | 1 | 1 | {fqg, fsg} |
| ARR13 | 1 | 1 | 1 | 1 | 0 | 1 | 0 | 1 | 1 | {fqg, fsgr} |
| ARR14 | 1 | 1 | 1 | 1 | 0 | 1 | 0 | 1 | 1 | {fpg2, fsgr} |
| ARR15 | 1 | 0 | 1 | 1 | 1 | 1 | 1 | 1 | 1 | {fpg2, fsg, fsgr} |
| ARR16 | 1 | 0 | 1 | 1 | 1 | 1 | 1 | 1 | 1 | {fqg, fsg} |
| ARR17 | 1 | 1 | 1 | 1 | 1 | 1 | 1 | 1 | 0 | {fqg} |
| ARR18 | 1 | 0 | 1 | 1 | 1 | 1 | 1 | 1 | 1 | {fpg2, fsg} |
| ARR19 | 1 | 0 | 1 | 1 | 1 | 1 | 1 | 1 | 1 | {fsg, fsgr} |
| ARR20 | 1 | 1 | 1 | 1 | 1 | 1 | 1 | 1 | 1 | {fpg2, fsgr} |
| ARR21 | 1 | 1 | 1 | 1 | 1 | 1 | 1 | 1 | 1 | {fqg} |
| ARR22 | 1 | 1 | 1 | 1 | 1 | 1 | 1 | 1 | 1 | {fpg2} |
| ARR23 | 1 | 1 | 1 | 1 | 1 | 1 | 1 | 1 | 1 | {fsgr} |
| ARR24 | 1 | 0 | 1 | 1 | 1 | 1 | 1 | 1 | 1 | {fpg2, fsg} |
| ARR25 | 1 | 0 | 1 | 1 | 1 | 1 | 1 | 1 | 1 | {fsg} |
| ARR26 | 1 | 1 | 1 | 1 | 1 | 1 | 1 | 1 | 1 | {fpg2} |

We independently confirmed by applying the method subject of the invention, as can be seen from the resulting FSM, that, as from the known method, the faults in GCVh (Gas Control Valve), Inject (Injector pressure) and CPD (Compressor Pressure) cannot be distinguished from each other. That is, the fault signature vectors for these faults are identical, as can be seen in Table 9. Moreover, we can show that the faults in {Inject, CPD} cannot be distinguished, no matter what system of sensors is used. This is shown by the HFSM since, even assuming that all the 9 possible sensors are deployed, the fault signature vectors Inject and CPD remain identical. That is, due to the lack of adequate sensors, these two faults cannot be discriminated.

Moreover, it is possible to perform an additional analysis of the existing sensors with a rather interesting and surprising result.

By using the method subject of the invention it is possible to show that actually one of the 4 deployed sensors, FSGR, is redundant.

To perform this analysis we applied a sensor optimization algorithm as described in U.S. Pat. No. 7,249,003 (application No. US2006/195302), inventors A. Fijany and F. Vatan; "A New Efficient Algorithm for Analyzing and Optimizing the System of Sensors", *IEEE Aerospace Conference*, March 2006; A. Fijany and F. Vatan, "A New Method for Sensor Placement Optimization," *Proceedings of 41st AIAA/ASME/SAE/ASEE Joint Propulsion Conference*, July 2005, A. Fijany and F. Vatan, "A Unified and Efficient Algorithmic Approach to Model-based Diagnosis and Optimal Sensor Placement," *Proceedings of 8th International Symposium on Artificial Intelligence, Robotics and Automation in Space (i-SAIRAS)*, September 2005.

It is assumed that the sensors can be deployed at four locations as FSGR, FQG, FPG2, FSG, i.e., the location of existing sensors. The optimization algorithm then determined, given the four possible locations, that the optimal sensors set to achieve the maximum possible detection and isolation capability is the set of {FQG, FPG2, FSG}.

The FSM corresponding to this set of sensors is shown in Table 10.

As can be seen, in comparison with Table 9, the three sensors set {FQG, FPG2, FSG} achieves exactly the same level of fault detection and isolation as the sensors set {FSGR, FQG, FPG2, FSG}.

This clearly indicates that, in the current deployed system, sensor FSGR is redundant, i.e., it does not provide any additional information for fault detection and isolation.

CONCLUSIONS

A new method for generating the complete set of analytical redundancy relations (ARRs) has been described. The ARRs are used for analyzing, optimizing and, validating a system of sensors for the control of a plant, as well as to provide a base for system diagnostics.

It is demonstrated that the method subject of the invention is efficient, in the sense that the number of operations required to find all the ARRs in a system with L relations has a complexity polynomial in L.

The power of this algorithm has been shown by applying it to synthetic and industrial examples.

As stated before, the derivation of the ARRs in an implicit form is sufficient for sensor analysis and optimization.

However, for model-based diagnosis the explicit form of ARRs is needed for their evaluation. In this case, the method here described can be used in conjunction with a symbolic manipulator tool to derive such explicit forms for the ARRs from the known primary relations. In particular, note that the algorithm generates the ARRs by indicating their step-by-step derivation.

Particularly, the algorithm to obtain the ARRs subject of the invention has three main applications:
1. Systems Analysis For a system or existing plant and their associated set of sensors the tool subject of the invention, can generate the complete set of ARRs and consequently the fault signature matrix FSM. The columns of said FSM show the components (or faults) while the rows show the ARRs. A simple FSM analysis can show the inherent diagnosability degree of the

TABLE 10

Fault Signature Matrix for 3 sensors in the Gas Turbine System

| ARR | GCVh | GCVm | Inj | SRVh | SRVm | TCpd | Tfqg | Tfsg | Tfsgr | Sensors |
|---|---|---|---|---|---|---|---|---|---|---|
| ARR1 | 0 | 1 | 0 | 0 | 0 | 0 | 0 | 1 | 0 | {fsg} |
| ARR2 | 0 | 0 | 0 | 1 | 1 | 0 | 0 | 0 | 0 | {fpg2} |
| ARR3 | 0 | 0 | 0 | 1 | 1 | 0 | 1 | 0 | 1 | {fpg2, fqg} |
| ARR4 | 0 | 0 | 0 | 1 | 1 | 0 | 1 | 0 | 1 | {fqg} |
| ARR5 | 1 | 0 | 1 | 1 | 0 | 1 | 0 | 1 | 0 | {fpg2, fqg, fsg} |
| ARR6 | 1 | 1 | 1 | 1 | 0 | 1 | 0 | 1 | 0 | {fpg2, fqg} |
| ARR7 | 1 | 0 | 1 | 1 | 1 | 1 | 1 | 1 | 1 | {fqg, fsg} |
| ARR8 | 1 | 0 | 1 | 1 | 1 | 1 | 1 | 1 | 1 | {fqg, fsg} |
| ARR9 | 1 | 1 | 1 | 1 | 1 | 1 | 1 | 1 | 0 | {fqg} |
| ARR10 | 1 | 0 | 1 | 1 | 1 | 1 | 1 | 1 | 1 | {fpg2, fsg} |
| ARR11 | 1 | 1 | 1 | 1 | 1 | 1 | 1 | 1 | 1 | {fqg} |
| ARR12 | 1 | 1 | 1 | 1 | 1 | 1 | 1 | 1 | 1 | {fpg2} |
| ARR13 | 1 | 0 | 1 | 1 | 1 | 1 | 1 | 1 | 1 | {fpg2, fsg} |
| ARR14 | 1 | 0 | 1 | 1 | 1 | 1 | 1 | 1 | 1 | {fsg} |
| ARR15 | 1 | 1 | 1 | 1 | 1 | 1 | 1 | 1 | 1 | {fpg2} | system, i.e. the degree of detection and isolation (discrimination) of faults, regardless of the diagnostic techniques used.

2. System Design and Optimum Placement of Sensors

For system optimization, given the system model and all possible hypothetical locations of the sensors, this algorithm generates the hypothetical fault signature matrix (HFSM), which is the starting basis for sensor optimization.

3. System Diagnostics

Given a system and its set of sensors, this algorithm generates the complete set of ARRs for these sensors. For diagnosis purposes, the ARRs are calculated on the basis of the sensors readings. If a given ARR is not satisfied, then the set of components associated with that ARR includes at least one faulty component.

Of course, as far as the principle of the invention is maintained, the forms of implementation and details of embodiments can be widely varied with respect to what has been here described and illustrated purely as a non-limiting example, while remaining within the scope of the invention defined by the attached claims.

What is claimed is:

1. A computer-implemented method for generating a set of analytical redundancy relations representative of a system comprising industrial equipment with which a plurality of sensors is associated for the observation of variables indicative of operating conditions of the industrial equipment and adapted to enable detection and discrimination of faults,
the system being describable by a model based on the arrangement of the industrial equipment, comprising a set of primary relations between inputs provided to each equipment component from the industrial equipment and outputs provided from said each equipment component, indicative of an operating function of said industrial component,
wherein each analytical redundancy relation from the set of analytical redundancy relations is derived using at least one of the primary relations and is a function of a subset of observable variables of the system, which are signals that are observed by the system based on said inputs and outputs from the industrial equipment as measured by the sensors and has a subset of the industrial equipment as its support,
the method comprising generating by a computer the set of analytical redundancy relations of the system from a set V of intermediate relations established between the observable variables and non-observable variables of the system, wherein the non-observable variables represent input and output signals whose values cannot be measured,
wherein each intermediate relation is generated by combining two predetermined relations $R_j=(N_j, C_j, S_j, T_j)$ and $R_k=(N_k, C_k, S_k, T_k)$,
where $N_j$, $N_k$ being the sequence numbers assigned to relations $R_j$, $R_k$, respectively, each of which is expressed in an implicit form as a tuple (i) of a subset $S_j$ of system variables which represent at least one value measured by at least one of the sensors, (ii) of the set $C_j$ of the support components for said relation, where the support components comprise at least one equipment component of the industrial equipment, and (iii) of the set $T_j$ of the primary relations used to derive said intermediate relation, where the $T_j$ comprises at least two of the primary relations at a first iteration and at least one intermediate relation in subsequent iterations which is derived by one of the previous iterations;
wherein said each intermediate relation is derived according to the rule:

$$R=(N, C_j \cup C_k, (S_j \cup S_k)-\{x\}, T_j \cup T_k),$$

where $(S_j \cup S_k)-\{x\}$ denotes a symmetric difference operation on the variable subsets $S_j$, $S_k$ for each non observable variable $x \in S_j \cap S_k$,
when both the conditions:

$$S_j \cap S_k \neq \{\} \text{ and } T_j \cap T_k = \{\}$$

are satisfied, and
wherein the generation of the set of intermediate relations V comprises performing a series of cycles of combination between pairs of predetermined relations, each combination cycle being performed between a first relation belonging to a set of background relations and a second relation belonging to a set of derived relations.

2. A method according to claim 1, wherein said set V of intermediate relations does not include identical intermediate relations, according to the relationship of identity:

$$(S_j, T_j)=(S_k, T_k).$$

3. A method according to claim 1, wherein the set of background relations is the set of primary relations.

4. A method according to claim 1, wherein in the first cycle the set of derived relations is the set of primary relations.

5. A method according to claim 1, comprising iterating series of combination cycles, wherein the set of background relations is a set of derived relations generated from the preceding series of cycles.

6. A diagnosis system or a system for a structural analysis of a sensor arrangement, comprising:
a plurality of sensors which are associated for the observation of variables indicative of operating conditions and adapted to enable detection and discrimination of faults; and
a processor configured to implement a method for generating the set of analytical redundancy relations,
wherein the system is representative of a system comprising industrial equipment with which the plurality of sensors are associated for the observation of variables indicative of operating conditions of the industrial equipment and adapted to enable detection and discrimination of faults,
wherein the system is describable by a model based on the arrangement of the industrial equipment, comprising a set of primary relations between inputs provided to each equipment component from the industrial equipment and outputs provided from said each equipment component, indicative of an operating function of said industrial component,
wherein each analytical redundancy relation from the set of analytical redundancy relations is derived using at least one of the primary relations and is a function of a subset of observable variables of the system, which are signals that are observed by the system based on said inputs and outputs from the industrial equipment as measured by the sensors and has a subset of the industrial equipment as its support,
wherein the processor implements the method comprising generating by a computer the set of analytical redundancy relations of the system from a set V of intermediate relations established between the observable variables and non-observable variables of the system, wherein the non-observable variables represent input and output signals whose values cannot be measured, wherein each intermediate relation is generated by combining two predetermined relations $R_j=(N_j, C_j, S_j, T_j)$ and $R_k=(N_k, C_k, S_k, T_k)$, where $N_j$, $N_k$ being the sequence numbers assigned to relations $R_j$, $R_k$, respectively, each of which is expressed in an implicit form as a tuple (i) of a subset $S_j$ of system variables which represent at least one value measured by at least one of the sensors, (ii) of the set $C_j$ of the support components for said relation, where the support components comprise at least one equipment component of the industrial equipment, and (iii) of the set $T_j$ of the primary relations used to derive said intermediate relation, where the $T_j$ comprises at least two of the primary relations at a first iteration and at least one intermediate relation in subsequent iterations which is derived by one of the previous iterations;

wherein said each intermediate relation is derived according to the rule:

$$R=(N, C_j \cup C_k, (S_j \cup S_k) - \{x\}, T_j \cup T_k),$$

where $(S_j \cup S_k) - \{x\}$ denotes a symmetric difference operation on the variable subsets $S_j$, $S_k$ for each non observable variable $x \in S_j \cap S_k$, when both the conditions:

$$S_j \cap S_k \neq \{\} \text{ and } T_j \cap T_k = \{\}$$

are satisfied, and wherein the generation of the set of intermediate relations V comprises performing a series of cycles of combination between pairs of predetermined relations, each combination cycle being performed between a first relation belonging to a set of background relations and a second relation belonging to a set of derived relations.

7. A non-transitory computer readable medium storing at least one computer program executable by a processor, comprising one or more code modules for implementing the method for generating a set of analytical redundancy relations according to claim 1.

* * * * *